Jan. 26, 1960

R. L. HACKMAN ET AL 2,922,871

GAS SHIELDED ARC WELDING

Filed Dec. 12, 1958

INVENTORS
ROBERT L. HACKMAN
RAYMOND P. SULLIVAN
ROSCOE R. LOBOSCO
BY Barnwell P. King
ATTORNEY

United States Patent Office 2,922,871
Patented Jan. 26, 1960

2,922,871

GAS SHIELDED ARC WELDING

Robert L. Hackman, Morris Plains, Raymond P. Sullivan, Jersey City, and Roscoe R. Lobosco, Fanwood, N.J., assignors to Union Carbide Corporation, a corporation of New York Application December 12, 1958, Serial No. 780,080

7 Claims. (Cl. 219—131)

This invention relates to gas shielded arc welding wherein a pilot arc is transferred from an auxiliary electrode to work as contact therebetween is established, and more particularly to a novel electrical system for automatically ensuring transfer of the pilot arc from the work back to such auxiliary electrode when such contact is broken by movement of the cup away from the work.

One of the pilot-arc systems in the prior spot welding art wherein the cup comes into contact with the work employed a single D.C. power source for both the pilot-arc and "main" or welding arc. Since the pilot arc was a relatively low current arc, restriction of the current flow for the pilot arc was obtained by a resistor in the ground lead of the pilot-arc circuit. Also, since a common power source was utilized, control of the welding arc had to be through interruption of the pilot-arc circuit in such ground lead. This was accomplished with a relatively expensive secondary welding contactor.

Such method of pilot-arc starting has several disadvantages, such as:

(1) On breaking the contact between work and cup undesirable series arcs frequently are struck between the main electrode and work and the work and cup. Such series arcing causes objectionable defects sufficient to cause rejection of the resulting so-welded thin materials, such as heat-treated high-strength (17–7 pH) stainless steel.

(2) Such series arcing may result in failure of the pilot arc to transfer back from work to cup. Lack of transfer results in loss of the pilot arc.

(3) Cup life is not long (evidence of wear in about three hours; maximum life about 40 hours). A current flow of 6 to 8 amps. is required to maintain pilot arc stability. Such current value causes excessive cup erosion.

In the course of development a pilot-arc system employing a 70–75 V.O.C. main power supply and a relatively high open circuit voltage (90–105 V.O.C.) pilot-arc power supply was used. In such system the cup was continually connected to the work. The high open circuit voltage permits lower current pilot arcs. As a result of the lower current, cup life is proportionately increased. Also, the high open circuit supply permits the pilot arc to be drawn to such a length that it will transfer back from the work to the cup, when the resistance between the work and the main electrode is greater than that between the main electrode and cup. A lower open circuit voltage pilot-arc power supply (70–75 V.O.C.) could not be used in such method because it does not have the ability to produce enough voltage to maintain the pilot arc until the point is reached where the resistance between work and main electrode is greater than that between main electrode and cup.

It was found, however, that when using a high open circuit voltage there is a possibility that the open circuit voltage (90–105 V.O.C.) of the pilot-arc power supply could be impressed on the rectifier stacks of the main welding supply (70–75 V.O.C.) should the cup touch the work when no pilot arc exists and should the welding contactor be closed.

The main purpose of the invention is to eliminate the above mentioned disadvantages.

It is also an object of this invention to provide means for simply and practically causing the pilot arc to positively transfer back to the auxiliary electrode-cup at the completion of each spot weld.

Another object is to entirely eliminate harmful series arcing between the work and cup.

Still another object of this invention is to effect an economy by the elimination of an expensive secondary contactor in the pilot-arc circuit.

A further object is to provide a two-power supply system wherein the pilot-arc power supply open circuit voltage is not appreciably in excess of or less than that of the main power supply.

Briefly, the invention comprises two electrical power supplies consisting of a main or welding supply and a pilot arc power supply. The pilot-arc power supply open circuit voltage is not appreciably in excess or less than that of the main power supply. Connected across the cup and main electrode of the pilot-arc circuit is a voltage sensing device. This device automatically operates at a predetermined voltage to open a contactor to drop the work out of the pilot-arc circuit at a value where the voltage output of the pilot-arc supply is sufficient to maintain the pilot arc between work and main electrode; and where the voltage between work and main electrode is less than that between main electrode and auxiliary electrode thus ensuring positive transfer of the pilot arc from work back to the auxiliary electrode.

In its simplest form the invention provides for maintaining the workpiece at the same relative potential of the secondary spaced electrode (cup) until such secondary spaced electrode is clear of the work, and then placing the secondary electrode at a higher potential than the work, causing the pilot arc to transfer from the work to the secondary electrode when the work is again made electrically neutral.

Figure 1:
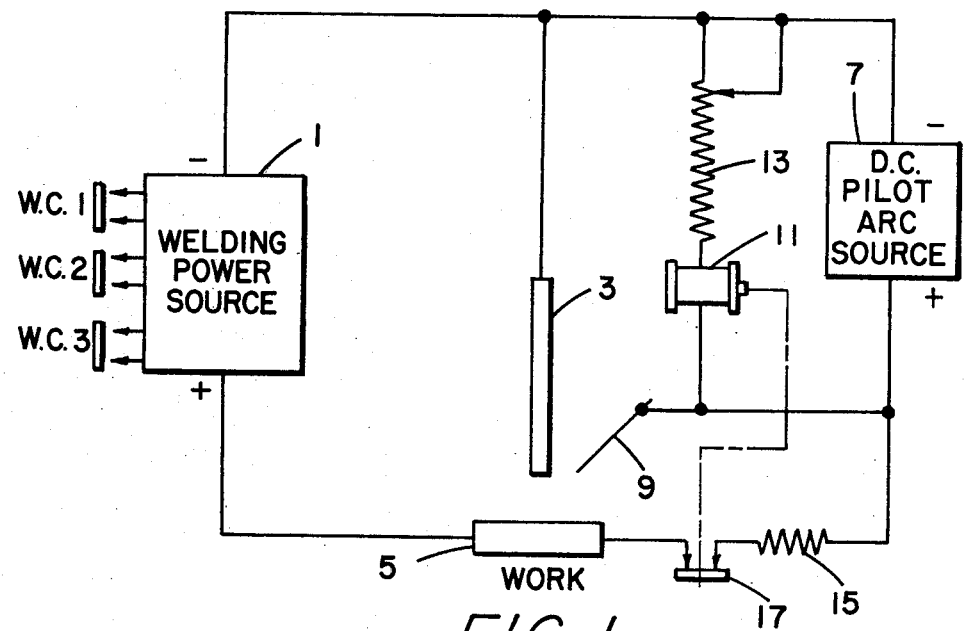
Fig. 1 is a circuit diagram of a preferred embodiment of the invention.

Referring now to Fig. 1, a D.C. welding power source 1 is connected across a main (welding) electrode 3 and the work 5 to be welded. A D.C. pilot-arc power supply source 7 has its negative side connected to the main electrode 3 and its positive side connected both to the secondary electrode or cup 9, and also through relatively inexpensive contactor 17 and resistor 15 to the work 5. A voltage responsive relay 11 and a variable resistor 13 are connected across the cup 9 and the main electrode 3. The resistor 15 is connected in the line leading from the pilot arc power supply 7 to the work 5. Also in this line is the normally closed contactor 17 of voltage relay 11 which operates to open and close the pilot-arc circuit to the work. The open circuit voltage of the pilot-arc source 7 is substantially equal to that of the welding power source 1.

In the circuit of the invention the secondary welding contactor, used in previous pilot-arc systems, is entirely eliminated. Elimination of such secondary welding contactor results in a great savings. Contactors of such type usually cost from $200 to $300 whereas contactor 17 costs about $5. When the welding power supply 1 is of the rectifier type, elimination of the secondary contactor is a real economical advantage, but other beneficial results of the invention may be obtained by leaving such secondary welding contactor in the circuit.

A pilot arc is initially struck between the main electrode 3 and the cup 9 with a probe (tungsten pencil). When the operator is ready to make a spot weld, the torch is advanced toward the work 5. As the cup 9 comes in contact with the work, they become electrically related and are at the same potential by virtue of physical contact and since both the cup and the work are connected to the pilot-arc power supply 7. The pilot arc then automatically transfers from the cup 9 to the work 5 since the arc gap between the work 5 and the main electrode 3 is less than that between such electrode 3 and the cup 9. Current for the pilot arc flows from the pilot-arc source 7 to the main electrode 3 to the work 5 and back through the cup 9 to the power supply 7. Some current also flows back through normally closed contactor 17 of the voltage relay 11, through the resistor 15 to the source 7. The operator then closes a trigger circuit which causes welding contactors WC1—3 to close, and welding current flows from welding power source 1 to main electrode 3, across the pilot arc to work 5 and back to source 1, spot welding the work under the torch which is supplied with inert gas, such as argon.

At the completion of the spot weld the operator opens the trigger circuit, causing contactors WC1—3 to open, breaking the main welding arc circuit, and separates the torch from the workpiece 5. As the cup 9 is withdrawn from the work 5, the pilot arc length is increased and the pilot arc voltage drop is increased and, as a result, the effective voltage on relay 11 is increased. In addition, at the instant the cup 9 is withdrawn from the work 5, the resistor 15 is effectively inserted in the circuit and the pilot arc current immediately establishes a voltage drop across this resistance. Such resistance voltage drop serves two important purposes:

(1) It further increases the effective voltage on relay 11, so that it becomes more sensitive to detecting small separation between the cup and the work.

(2) It places the cup 9 at a higher potential than the work 5 and thus tends to cause the arc positively to transfer back to the cup 9 even before contactor 17 opens (see description below).

As a result of the above, the relay 11 pulls in as soon as there is a small gap between the main electrode and work. The actual operating point of the relay 11 is determined by the setting of resistor 13.

When relay 11 pulls in, it opens contactor 17 and the pilot arc is forced either to transfer to the cup or collapse (extinguish). The fact that the higher potential on the cup (see above description) has already tended to transfer the arc makes the transfer action positive and therefore the pilot arc does not collapse.

While the primary purposes of the above described circuit is to transfer the pilot arc back to the cup at the completion of a weld, it also serves an unexpected and very useful purpose in eliminating the tendency towards double arcing which was present with previous circuits.

Also resistor 15 provides a safety precaution. When the main electrode 3 is away from the work 5 and the welding contactors WC1—3 are closed, main welding current flows from the main welding power source 1 to the main electrode 3 through the pilot arc to the cup 9 through resistor 15 to the work 5 back to the main welding supply 1. Resistor 15 will thus reduce unwanted current through contactor 17 to a value which has no deleterious effect.

Figure 2:
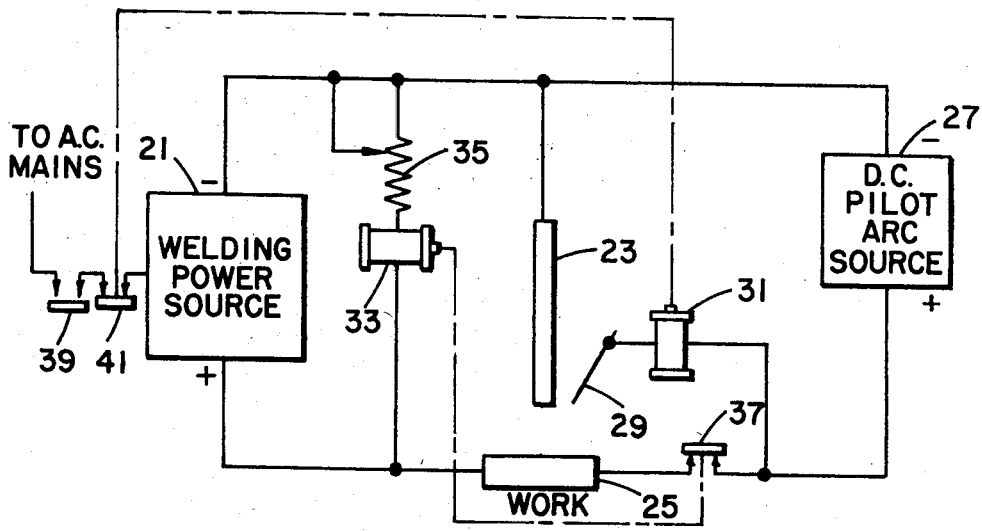
Fig. 2 is a circuit diagram of a modification of the invention.

In Fig. 2 a welding power source 21 is connected across the main electrode 23 of a torch and work 25. A pilot arc source 27 has its negative side connected to the main electrode 23 and its positive side connected both to the secondary electrode 29 through a blocking relay 31 and also through normally closed contactor 37 of a voltage relay 33 to the work 25. The voltage relay 33 and a variable resistor 35 are connected across the main electrode 23 and work 25. Connected in a supply line leading to the main welding power source 21 are contacts 39 of a trigger relay, and the contacts 41 of unwanted-current blocking relay 31. The coil and other circuitry associated with the trigger relay is not shown, it being merely a matter of choice and convenience in any particular situation.

A pilot arc is struck between the main electrode 23 and the cup 29. When the operator is ready to make a spot weld, he brings the torch toward the work 25. As the cup 29 comes in contact with the work 25, they become electrically related and are at the same potential since both the cup and work are connected to the pilot arc source 27. The pilot arc then transfers from the cup 29 to the work 25, since the arc gap between the work 25 and main electrode 23 is less than that between the main electrode 23 and cup 29.

Current for the pilot arc is supplied from the pilot arc power supply 27 to the main electrode 23 to the work 25. From the work the current has a parallel path back to the pilot arc supply 27. One leg of the parallel path is from the work 25 through normally closed contacts 37 of voltage relay 33 to power supply 27. The other is through the cup 29 through blocking relay 31 to the power supply 27.

At the completion of the spot weld the operator will extinguish the main welding arc and separate the torch from the work. As the torch is withdrawn from the work 25, the pilot arc is drawn to a longer length. The voltage across the main electrode 23 and work 25 will increase until it reaches a voltage value which will activate voltage relay 33. This value is predetermined by the setting of variable resistor 35. When voltage relay 33 is activated, normally closed contacts 37 open, breaking one leg of the parallel path from work to the pilot arc supply 27. As a result, the pilot arc is forced to transfer back from work 25 to the cup 29.

Blocking relay 31 is provided in this circuit as a safety precaution. When the main electrode 23 is away from the work 25, pilot arc current is flowing from the pilot arc supply 27 to the main electrode 23 across the pilot arc to the cup 29 through the blocking relay 31 back to pilot arc supply 27. The value of such pilot arc current is enough to actuate the relay 31, keeping normally closed contacts 41 of relay 31 open. Thus, even if the torch trigger is closed, no main welding powder is supplied to the circuit. When the torch touches the work 25, the pilot arc transfers from cup 29 to the work 25. As a result, a major portion of the pilot arc current flows through the work 25 and closed contactor 37 to the pilot arc supply. This de-energized blocking relay 31, closing contacts 41 and thus causing welding current to flow when contacts 39 of the trigger relay are closed.

While the auxiliary electrode may be the torch cup as described above, it may be a probe electrode carried by the torch, such as one adjacent the cup, in which case the cup may be made of non-conductive material.

We claim:

1. An arc welding system comprising a torch including a main electrode and an auxiliary electrode, a direct current welding power source having a negative terminal connected to said main electrode and a positive terminal connected to the work to be welded, a direct current pilot-arc source having a negative terminal connected to said main electrode and a positive terminal to said auxiliary electrode, the open circuit voltage of said pilot-arc source being substantially equal to that of said welding power source, and a pilot-arc voltage response relay connected in such system, said relay having a normally closed contactor, a ground lead containing said contactor circuit connecting the positive terminal of said pilot-arc source to the work, said relay being operative to positively transfer a pilot-arc from said main electrode back to said auxiliary electrode when the pilot-arc voltage drop between said main electrode and work is increased to a predetermined value after the welding current circuit is broken.

2. An arc welding system as defined by claim 1, in which said pilot-arc ground lead circuit is provided with welding current blocking means comprising a resistor in series with said contactor.

3. An arc welding system as defined by claim 1, including a blocking relay in the circuit connecting said auxiliary electrode to the positive terminal of said pilot arc source, said blocking relay having contacts controlling the energization of said welding power source, so that flow of unwanted current in the pilot-arc ground lead circuit is prohibited by the operation of said blocking relay due to flow of pilot arc current therethrough.

4. A pilot-arc circuit including a main electrode, an auxiliary electrode, a workpiece, a main power supply connected between the main electrode and the work, a pilot arc power supply connected between the main electrode and the auxiliary electrode, a voltage sensing means connected across the pilot arc power supply, a circuit between the auxiliary electrode and the work, such circuit containing a resistance and a normally closed contact of the voltage sensitive means, such voltage sensitive means acting to transfer the pilot arc back to the auxiliary electrode at the completion of the weld.

5. In a gas shielded arc welding system, the combination with a gas shielded arc torch comprising a main electrode and an arc shielding gas cup constituting a pilot-arc electrode, and means for connecting said main electrode and work to be welded across a source of arc welding current; of means connecting said main electrode and pilot-arc electrode across a source of pilot-arc current separate from said welding current source, comprising a pilot-arc work lead circuit including normally closed voltage responsive relay contactor, and a pilot-arc electrode-main electrode circuit provided with a voltage responsive relay for automatically opening said contactor to positively cause the pilot arc to transfer from the work and to prevent undesirable arcing between said cup and work when contact therebetween is broken by withdrawal of the torch from the work after the main welding arc circuit is broken.

6. In an inert gas shielded arc-spot welding system, the combination with an arc torch comprising a main welding arc electrode and a gas cup constituting a pilot-arc electrode surrounding the end of said main electrode in spaced relation to provide an inert gas arc shielding annular passage, and a direct current welding power supply circuit having a positive terminal connected to work to be spot welded; of a separate pilot-arc direct current power supply circuit having a negative terminal connected to said main electrode and a positive terminal connected to such work through a series circuit including a resistor and normally closed voltage responsive relay contactor, and directly to said gas cup pilot-arc electrode; and a voltage responsive relay and an adjustable resistor connected in series circuit relation with each other across said main electrode and gas cup pilot-arc cup electrode; whereby a pilot arc is energized between said main electrode and cup, and when a spot weld is to be made such welding power supply is energized and the arc torch is advanced toward the work until the cup comes into contact with the work, whereupon such pilot arc automatically transfers from the cup to the work and establishes a main spot welding arc between the end of said main electrode and the work; and when the spot weld is completed the main welding arc circuit is broken and the torch is withdrawn from the work, breaking such contact between the cup and work, causing said voltage responsive relay to open said normally closed contacts, thereby effectively removing the work from the pilot-arc circuit, and positively transferring the pilot-arc from the work back to the cup, preventing any undesirable arcing between said cup and the work as said torch is so withdrawn.

7. An arc welding system as defined by claim 4, in which said pilot arc ground lead circuit is provided with welding current blocking means comprising a resistor in series with said contactor.

References Cited in the file of this patent
UNITED STATES PATENTS

| | | |
|---|---|---|
| 2,340,093 | White | Jan. 25, 1944 |
| 2,516,037 | Williams | July 18, 1950 |
| 2,769,118 | Lester | Oct. 30, 1956 |
| 2,798,937 | Miller | July 9, 1957 |